United States Patent [19]

Harbin

[11] Patent Number: 4,989,631

[45] Date of Patent: Feb. 5, 1991

[54] VALVE DEVICE WITH CONTROL SLEEVE AND CHECK VALVE

[76] Inventor: Roy W. Harbin, 8705 Heather, Odessa, Tex. 79764

[21] Appl. No.: 523,495

[22] Filed: May 14, 1990

[51] Int. Cl.⁵ .............................................. F16K 15/18
[52] U.S. Cl. ................................ 137/269.5; 137/244; 137/315; 137/614.17; 251/312
[58] Field of Search ...................... 137/244, 269.5, 270, 137/315, 527, 614.16, 614.17, 614.18; 251/209, 309, 312

[56] References Cited

U.S. PATENT DOCUMENTS

| | | | |
|---|---|---|---|
| 139,878 | 6/1873 | Dame | 137/614.17 |
| 280,011 | 6/1883 | Bradley | 137/269.5 |
| 314,216 | 3/1885 | Barker | 137/614.17 |
| 1,005,523 | 10/1911 | Dunlap | 137/269.5 |
| 1,175,328 | 3/1916 | Wright | 137/614.17 |
| 1,465,176 | 8/1923 | Raulerson | 137/269.5 |
| 2,151,098 | 3/1939 | Greenwood | 137/614.17 |
| 2,997,057 | 8/1961 | Toth | 137/315 |
| 3,146,792 | 9/1964 | Donnelly et al. | 137/614.17 |
| 3,191,628 | 6/1965 | Kirkwood et al. | 251/900 |
| 3,348,569 | 10/1967 | Frye | 137/269.5 |
| 3,363,650 | 1/1968 | Scaramucci | 137/614.17 |
| 3,474,818 | 10/1969 | Hartman | 137/269.5 |
| 3,484,078 | 12/1969 | Haenky | 251/312 |
| 3,707,161 | 12/1972 | Crawford | 137/269 |
| 3,854,497 | 12/1974 | Rosenberg | 137/557 |
| 4,371,146 | 2/1983 | Mese | 251/209 |
| 4,736,771 | 4/1988 | McCafferty | 137/614.17 |

Primary Examiner—George L. Walton
Attorney, Agent, or Firm—Marcus L. Bates

[57] ABSTRACT

A full opening sleeve valve device with check valve for controlling fluid flow through a line pipe or the like. The valve device has a housing, and a flow passageway extends through the housing and terminates at opposed ends thereof. The opposed ends of the housing passageway can be connected to the confronting ends of a pipe line. A bore extends through the housing and a flow control sleeve is rotatably received within the bore and sealingly engaging the peripheral wall surface of the bore. The sleeve has opposed ports that can be selectively rotated into registry with the flow passageways to align the ports with the passageway whereupon unrestricted flow can occur through the valve device. The check valve is a movable wall section of the sleeve and forms a closure member for a sleeve port and cooperates with the bore to form a check valve. When the ports are aligned with the passageway, the check valve is moved to the opened position when flow occurs in one direction and is moved into the closed position when flow occurs in an opposite direction. An actuator is provided for rotating the sleeve between an open and closed position wherein flow in either direction is precluded.

6 Claims, 2 Drawing Sheets

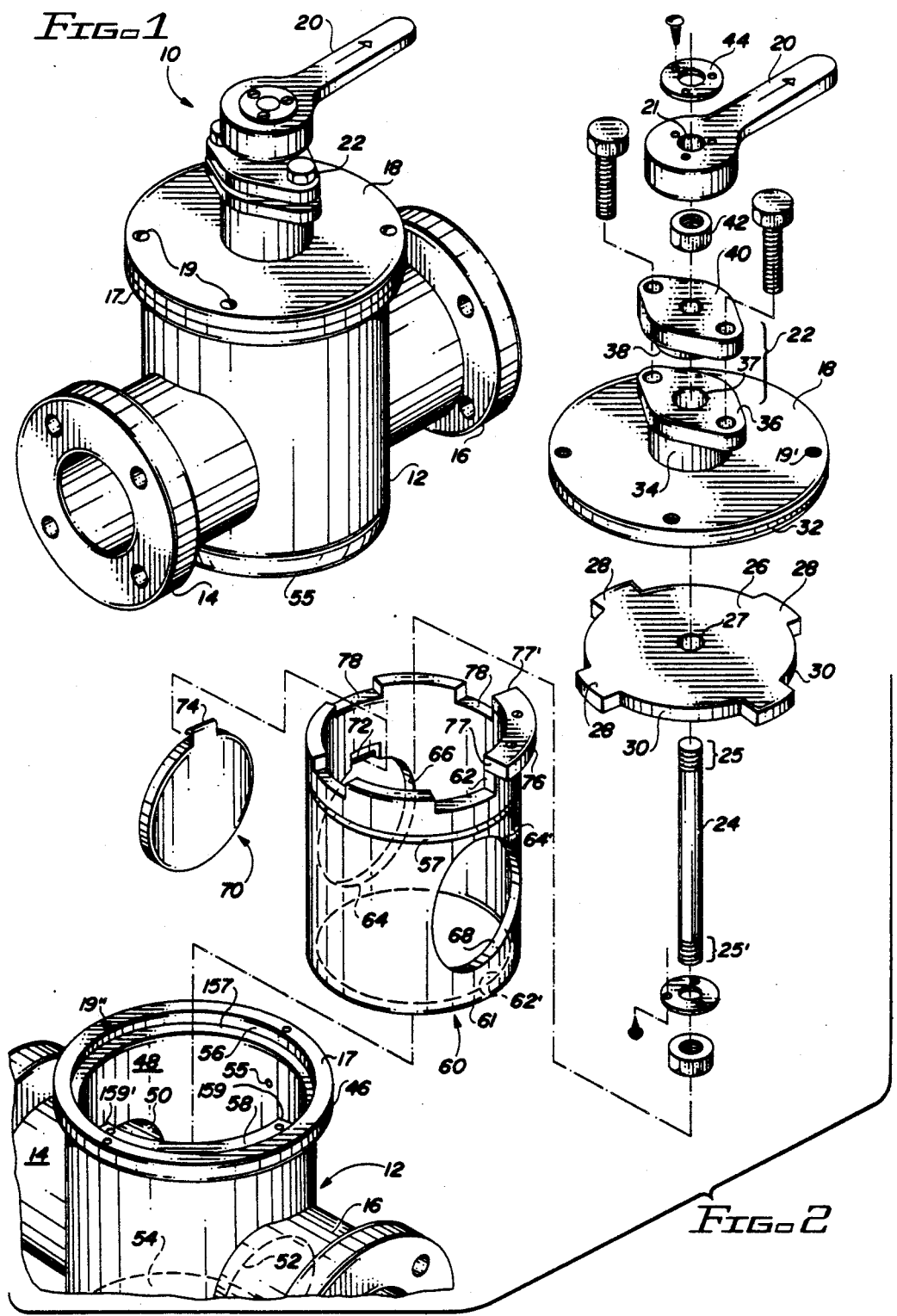

VALVE DEVICE WITH CONTROL SLEEVE AND CHECK VALVE

BACKGROUND OF THE DISCLOSURE

Pipeline valves must have a valve element therein that admits a "pig" or cleaning device to travel therethrough in order to enable the interior of the pipeline to be cleaned from time to time. Accordingly, in the past, it has been necessary to employ a very large valve housing in order to make available a valve element having a flow passageway therethrough of a diameter equal to the nominal diameter of the pipeline. It would be desirable to have made available a valve device that can be series connected into a flow line, that has a valve element therein that receives a cleaning pig therethrough when the valve element is in the open position.

Furthermore, it would be desirous to have a check valve device associated with the valve means that permits unobstructed flow in one direction through the valve device and which prevents flow in the opposite direction. The above desirable valve structure is obtained in accordance with the present invention.

SUMMARY OF THE INVENTION

This invention is directed to a full opening sleeve valve device having a check valve included therein for controlling flow in either direction therethrough, and including a check valve which allows one way flow therethrough when the sleeve valve device is in the open position.

The valve of this invention includes a housing having a flow passageway formed therethrough with there being a bore formed transversely through the housing respective to the flow passageway. A rotatable flow control sleeve is sealingly received within the bore and can be rotated between an opened and a closed position. The flow control sleeve includes ports in opposed sidewalls thereof that are brought into alignment with the flow passageway when the valve is in the open position. The sleeve is therefore rotated about an axis that is perpendicular to the flow passageway to move the valve from an opened into a closed position; and vice versa.

A wall section of the sleeve is in the form of a check valve which is pivotally connected respective to one of the ports in the sleeve and can be pivoted from an opened to a closed position. The check valve, when the sleeve is in the opened position, admits flow in one direction through the flow passageway and prevents flow therethrough in the opposite direction.

An acuatating device engages the upper marginal end of the sleeve and includes a shaft member that extends through a top closure member, whereby the valve can be moved from an opened to a closed position by rotating the exposed terminal end of the shaft.

In one form of the invention, the upper marginal end of the sleeve is castellated and receives a complementary configured plate member in a removable manner whereby rotation of the shaft imparts rotation into the plate member which in turn rotates the sleeve into a selected position to achieve the desired flow characteristics.

The check valve is a movable section of the wall of the sleeve and includes a resilient o-ring on the outer face thereof that sealingly engages the wall surface of the bore adjacent the passageway and thereby positively seals against flow occurring through the passageway.

The valve sleeve can be moved to the closed position, the top closure member removed therefrom, thereby exposing the interior of the sleeve, whereupon the check valve element can be replaced, and then the valve can be reassembled without the necessity of removing the valve from the pipeline.

A primary object of the present invention is the provision of a full opening sleeve valve device having a check valve associated therewith for permitting unidirectional flow therethrough when the valve is in the opened position, and preventing flow in either direction therethrough when the valve is in the closed position, and additionally allowing the sleeve to be further rotated to thereby reverse the operative relationship of the check valve assembly.

Another object of the present invention is the provision of an improved valve device having an operating sleeve arranged transversely to a flow passageway that extends through the valve and sleeve, with there being a check valve attached to the sleeve that permits flow in one direction through the flow passageway and prevents flow in the opposite direction, and wherein the sleeve has a castellated upper end that operates in conjuction with a complementary plate member for rotating the sleeve from an opened to a closed position and vice versa.

Still another object of the present invention is the provision of a sleeve valve device having a check valve therewith for unidirectional flow therethrough when the valve is in the opened position, and preventing flow in either direction therethrough when the valve is in one of the closed positions, and additionally allowing the sleeve to be further rotated to thereby reverse the operative relationship of the check valve assembly.

A further object of the present invention is the provision of an improved valve device having an operating sleeve arranged transversely to a flow passageway that extends through the valve and sleeve, with there being a check valve attached to the sleeve that permits flow in one direction through the flow passageway and prevents flow in the opposite direction, and wherein the sleeve has a castellated upper end that operates in conjunction with a complementary plate member for rotating the sleeve from an opened to a closed position.

Another object of the present invention is the provision of an improved valve device having an operating sleeve arranged transversely to a flow passageway that extends through the valve and sleeve, with there being a check valve attached to the sleeve that permits flow in one direction through the flow passageway and prevents flow in the opposite direction; wherein the check valve is a movable section of the sleeve and further includes seal means on an external face thereof that sealingly engages the inner surface of the bore with the flow passageway being sealed by the check valve.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described herein.

BRIEF DESCRIPTION OF THE DRAWINGS

FIG. 1 is a perspective, left, three-quarter view of a valve apparatus made in accordance with the present invention;

FIG. 2 is an exploded view of the valve device seen in FIG. 1, with some parts being broken away therefrom in order to conserve drawing space;

FIG. 5 is a bottom view of part of the apparatus disclosed in FIG. 1, with some parts being removed therefrom in order to disclose additional details thereof;

DETAILED DESCRIPTION OF THE PREFERRED EMBODIMENT

Figure 3:
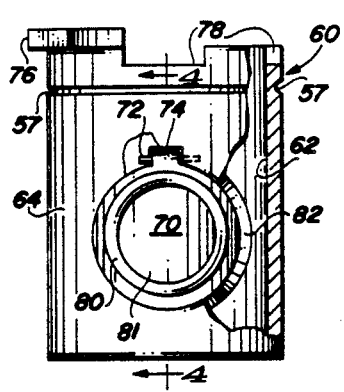
FIG. 3 is a side elevational view of part of the apparatus disclosed in the foregoing figures, with some parts being broken away therefrom and some of the remaining parts shown in cross-section.

FIG. 1 of the drawing discloses a full opening valve device indicated by the arrow at numeral 10. The valve device 10 includes a main body that forms a housing 12 having flow passageway formed therethrough that terminates in opposed ends 14 and 16, one of which is an inlet and the other of which is an outlet. The valve is reversible and therefore either end 14 or 16 can be called an inlet while the other is referred to as the outlet. The housing 12 has an upper end 17 and a closure member or cover plate 18 is removably affixed at the upper terminal end of the housing by means of the illustrated fastener devices 19. The fastener devices 19 can take on any known form and preferably includes a multiplicity of bolts that describe a bolt circle in a manner known to those skilled in the art of valve devices.

An actuator handle 20, which can take on any number of different forms, moves the valve device 10 between an opened and a closed position, as will be more fully explained later on herein. The handle 20, as seen in FIG. 2, has a shaft receiving splined hole 21 formed therein. A seal assembly 22 upwardly extends from the cover plate 18.

As seen in FIG. 2, together with other figures of the drawings, a shaft 24 extends through the seal assembly 22 and into the splined hole 21. The opposed marginal ends 25, 25' of the shaft perferably is splined or made irregular for enabling rotational motion to be transferred by the shaft 24 into a plate member 26 which is apertured at 27 and is of a configuration to receive the lower splined marginal end 25' of the shaft 24 therein. The plate member 26 has radial lugs 28 formed by crescent cutouts 30. Numeral 32 indicates the circumferentially extending edge portion of the cover plate 18.

The seal assembly 22 preferably is in the form of a packing gland and includes an upstanding bushing chamber 34 that is rigidly attached to and terminates in a flange 36. A counterbore 37 receives the illustrated downwardly directed neck 38 that compresses packing contained within the counterbore 37.

Flange 40 is removably attached to flange 36 by the illustrated packing gland bolts. Nuts 42 are threadedly made up to the opposed ends of shaft 24 and rigidly hold plate member 26 and handle 20 in assembled relationship along with the other illustrated components of the actuator apparatus. Cover 44 is attached in axial aligned relationship respective to splined hole 21. The upper terminal end 17 of housing 12 can be in the form of an outwardly directed flange 46 if desired, while the cover plate 18 can be made of equal diameter respective to the flange 46, if desired, to facilitate location of the fastener devices 19.

A transverse bore having an inner peripheral surface 48 preferably is cylindrical in configuration and includes inlet port 50 and outlet port 52. Numeral 54 indicates the bottom of the counterbore while numeral 55 indicates the lowermost surface of the valve device. Numeral 54' is a threaded plug receiving outlet for a drain. The upper, marginal, circumferentially extending surface of the bore 48 has an outwardly directed enlarged diameter bore 56 that results in the illustrated shoulder 157 formed thereon for purposes which will be more fully discussed later on herein. Fixed stop member 58 is attached to the shoulder 157. Opposed ends 159, 159' of the stop member 58 described an included angle of 90 degrees, more or less.

A sleeve 60, made in accordance with the present invention, has a lower terminal end 61 received against the bottom 54 of the housing 12. The outer cylindrical sidewall of the sleeve 60 slidably engages the inner cylindrical sidewall 48 of the housing bore. A groove 57 circumferentially extends about the exterior of the sleeve and captures the opposed followers 59, 59' therein. The upper edge 62 of the sleeve is castellated. The inner peripheral wall surface 62' is interrupted by opposed flow ports 64, 64'. Flow port 64 is provided with a wedge or angled surface 66 while port 64' is provided with an edge portion 68. The wedge surface 66 of flow port 64' is used in conjunction with a check valve element 70.

The check valve 70 is pivotally mounted within port 64 by hinge pin 72. The check valve 70 has hinge part 74 located at the upper extremity thereof for receiving hinge pin 72 and therefore gravitates into a closed position. Curved stop members 75 is attached to the check valve 70 and allows the check valve to pivot somewhat more than 90 degrees into the interior of the sleeve so that the check valve is clear of the flow passageway and therefore free of a pig or the like that may be traveling through the pipe and valve system.

Figure 7:
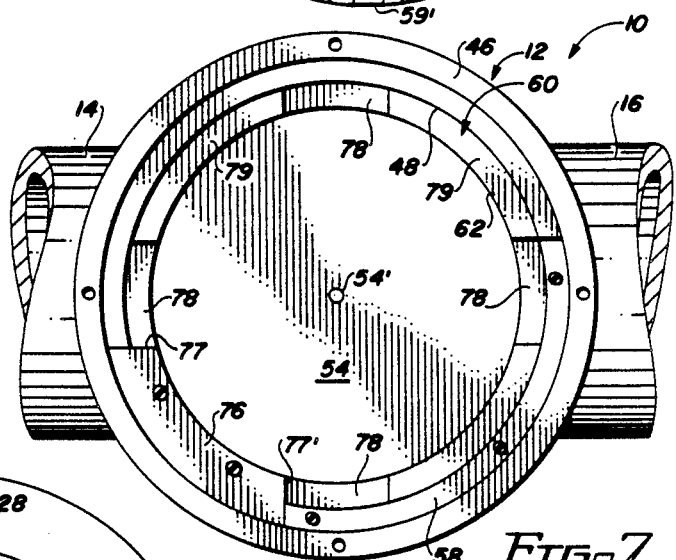
Figure 8:
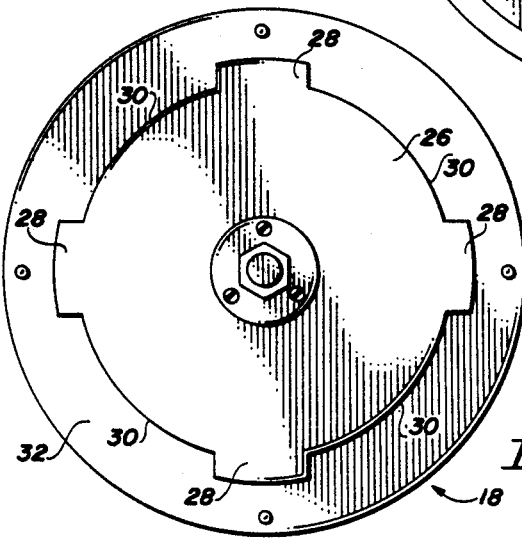

As best seen in FIGS. 2 and 7, a crescent shaped stop member 76 is attached to the upper end 62 of the sleeve 60. The crescent shaped stop member has end portions 77, 77' that orient the sleeve ports 64, 64' in an opened position wherein ports 64, 64' are aligned with the passageway at 14' and 16'; when in one position, and which are arranged in perpendicular relationship therewith when the sleeve is rotated into one of the closed positions. Cutouts 78, formed in the upper marginal end of the sleeve 60, result in the upper marginal end of the sleeve 60 having a castellated configuration. The lugs 28 of plate member 26 are of a size to be removably received within the cutouts 78 of sleeve 60 whereby the lugs engage and rotatably drive the sleeve in response to rotation of the handle 20.

Figure 4:
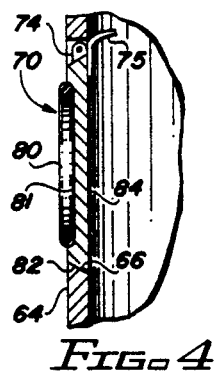
FIG. 4 is a fragment of a cross-sectional detail taken along line 4—4 of FIG. 3.
Figure 6:
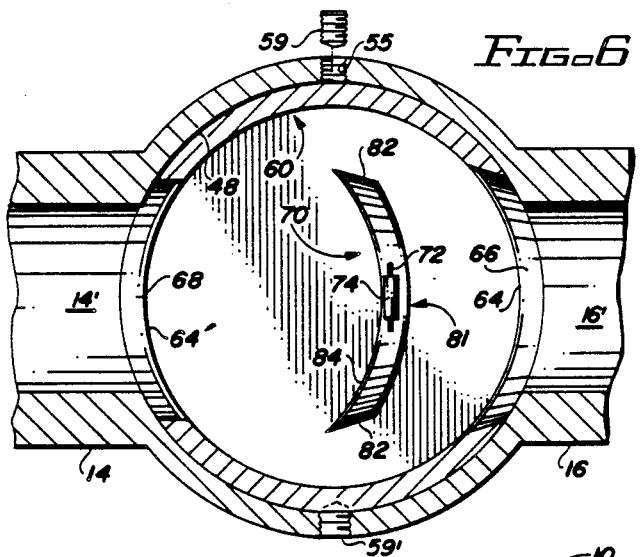
FIG. 6 is a longitudinal, cross-sectional view of the apparatus disclosed in FIG. 1; and, FIG. 7 is a top, plan view of part of the apparatus disclosed in FIG. 1, with some parts being removed therefrom, and other parts being broken away with some remaining parts being shown in cross-section.

As best seen in FIGS. 3, 4 and 6, the check valve 70 has an o-ring 80 seated within a groove 81. The circumferentially extending conical surface 82 of the check valve 70 diverges towards a point spaced from the valve seat 66 so that the check valve is wedgedly seated against the seat formed within port 64. The coacting wall surfaces are seen indicated by numerals 66 and 82 of FIGS. 4 and 6. The check valve 70 therefore has a circumferentially extending wedge face 82 that is wedgedly received within a port 64 having a complementary configured wedge face 66 and thereby forms a movable wall member respective to the sleeve 60. The diameter of the port 64 preferably is larger than the diameter of the inlet passageway 50 of the housing 12 whereby the o-ring seal 80 sealingly engages the inside peripheral surface 48 of the housing 12, with the end 50 of passageway 14 being located inside of the o-ring. Stated differently, the port 50 that is adjacent the sleeve is smaller in diameter compared to the diameter of o-ring 80 so that the o-ring diameter is greater than the port diameter and the o-ring therfore sealingly engages the inside peripheral wall surface 48 of the housing with the end 50 of the passageway being closed by the check valve 70 when the seat 66 of port 64 of the sleeve is concentrically aligned with the flow passageway end 50, and is therefore in the opened position. This enables the check valve 70 to sealingly engage the inside surface of the housing and prevent back flow when flow in the opposite direction occurs.

In operation, the valve of FIG. 1 is connected in series relationship with respect to a flow pipe, and the handle 20 is arranged to indicate that the full opening sleeve valve device with check valve is arranged for flow in the direction of the arrow on the handle. Accordingly, the check valve 70 is moved by the pressure differential thereacross into a fully opened position wherein outlet and inlet passageways 14' and 16' are aligned with ports 64, 64', with the outer cylindrical surface of the sleeve bearing against the surface that defines the ports 50, 52 and sealingly engaging the inner peripheral wall surface 48 of the housing 12. Accordingly, fluid is free to flow in one direction through the valve device, while flow is precluded from occurring in the opposite direction therethrough due to the action of the check valve 70 and the seat 66.

The operating handle 20 can be turned 90 degrees from the above opened position to align sleeve ports 64, 64' perpendicularly respective to the inlet and outlet ports 50, 52 of the housing. Moreover, the handle 20 can be turned 180 degrees from the one way flow position of FIG. 1 and thereby prevent flow in the other direction while again permitting flow in the opposite direction.

The valve is disassembled by first placing the handle 90 degrees respective to the flow position illustrated in FIG. 1, the plug at 54' is removed to assure no high pressure is present in the valve. Then the fasteners 19 are removed, whereupon the actuator, the top cover 18, and the actuator plate member 26 are easily lifted from the upper end of the housing as a unit, thereby exposing the sleeve 60. At this time, the check valve 70 can be replaced as may be desired, or alternatively, the valve can be isolated from pressure, and then the sleeve 60 can be lifted from the housing 12 after removing the keepers 59 from the groove 57.

The valve sleeve can be rotated into a first position to permit unidirectional flow therethrough; and, into a second position 180 degrees from said first position to provide for unidirectional flow in the opposite direction; and into a third or fourth position 90 degrees or 270 degrees from the first position to prevent flow in either direction.

The valve device of this invention provides an improved check valve and valve combination which has a hollow cylinder, which rotates within the body of the valve. The hollow cylinder is operated manually by a valve handle connected to a shaft which extends through a bolted flange on top of the valve body, and rotates the hollow cylinder by means of an interlocking plate. The check valve or clapper is made from the cylinder wall and has an o-ring which seats against the valve body. The clapper when in line with the flow acts as a check valve. When the valve handle is turned 90 degrees, the clapper is positioned at the side of the valve body and will stop flow from both directions. This allows removal of the top flange and replacement or repair of the clapper. When the valve handle is turned 180 degrees, it places the clapper on the reverse side and stops flow in the normal direction but permits reverse flow to take place.

The reversible check valve of this invention eliminates the necessity of a bypass around a check valve, and makes removing the clapper from the check valve unnecessary in order to flow in the opposite direction. This valve can be made to operate automatically as well as manually. The valve can be made from steel for oil and gas operation, and because of its simple design, it can also be made from PVC for water systems.

The valve has a full open bore which will allow for passage of a pig when cleansing the line. It could be made for high or low pressure for oil, gas or water and have flanged or threaded ends, as may be desired.

I claim:

1. A full opening sleeve valve device for controlling fluid flow comprising:

a housing, a flow passageway though said housing terminating in opposed ends, means by which the opposed ends of the passageway can be connected in a pipe; a bore extending through said housing transversely respective to said flow passageway and forming confronting passageway ends that terminate at and communicate with said bore, a flow control sleeve rotatably received within said bore and sealingly engaging the peripheral surface of the bore and thereby preventing flow through said passageway;

opposed ports in said sleeve diametrically opposed to one another that can selectively be rotated into registry with said flow passageway to thereby align said ports with said confronting passageway ends whereupon unrestricted flow can occur through the valve device;

check valve means for one of the sleeve ports arranged whereby when said sleeve is rotated to align said sleeve ports with said passageway confronting ends, said check valve can be moved into the opened position when flow occurs in one direction through said passageway, and said check valve means can be moved into the closed position when said sleeve is rotated to reverse the relationship of the sleeve ports respective to the confronting passageway ends and thereby effect flow in an opposite direction;

an actuator for rotating said sleeve to bring either of the sleeve ports into alignment with either of the confronting passageway ends and thereby place the valve in either of several alternate flow positions including an open and closed position; said actuator includes a plurality of castellations formed adjacent the upper marginal end of said sleeve, and a plate member having a plurality of projections formed thereon for being received within the intervening space between said castellations; shaft means for rotating said plate member and thereby rotating said sleeve from one into another flow position; an arcuate stop means on said body, said arcuate stop means has opposed ends, and stop means on said sleeve for abuttingly engaging the opposed ends of said arcuate stop means when said sleeve is rotated to selectively position the sleeve ports respective to the passageway confronting ends.

2. The valve device of claim 1 wherein said check valve means has an outer circumferentially extending surface that is brought to bear against the surface that defines one of said ports with a wedge-like action, whereby the check valve means, when in the closed position, prevents fluid flow in one direction therethrough;
　an o-ring received on the outside surface of said check valve means; said o-ring is of greater diameter than said flow passageway and thereby is brought into sealing engagement with the wall surface of the bore adjacent the confronting passageway ends; and, said sleeve is cylindrical and can be positioned to permit the check valve element to be removed from the interior of the sleeve valve.

3. A valve assembly having a flow passageway therethrough through which a pig can travel, means for connecting said flow passageway in series relationship respective to a flow line;
　said valve assembly includes a housing, an upwardly opening cylindrical bore in said housing, said flow passageway extends transversely through said cylindrical bore; a rotatable sleeve sealingly received within the bore with the outer peripheral surface of the sleeve engaging the inner peripheral wall surface of the bore;
　diametrically opposed ports in said sleeve that are brought into axial alignment with said passageway when the sleeve is rotated into alternate flow positions; said sleeve, when rotated to position the ports thereof transversely of said flow passageway, places the valve assembly in a flow preventing position;
　a closure member for said cylindrical bore, a sleeve actuator, shaft means for manipulating the sleeve actuator externally of said housing;
　a valve seat in one said sleeve port, a check valve in the last said sleeve port to prevent fluid flow through the flow passageway in one direction while permitting flow to occur through the flow passageway in the other direction;
　said sleeve includes a castellated upper marginal end forming cut-outs; said actuator includes an annular member having projections thereon that are received between said castellations; and said shaft means is connected for rotating said annular member and thereby rotate said sleeve between alternate positions; an arcuate member having opposed ends mounted on said body; stop means on said sleeve for engaging one of said opposed ends of the sleeve arcuate member when in the open position and to engage the other opposed end of said sleeve arcuate member when in the closed position; a closure member located at one end of said bore; seal means by which said shaft means extends through said closure member, one end of said shaft means engages said annular member, whereby, the opposed end of said shaft means can be engaged and rotated to thereby rotate said sleeve; and wherein said stop means on said sleeve and the ends of said arcuate member on said body can be brought into engagement with one another to selectively position the sleeve in the open position and to position the sleeve in the closed position.

4. A full opening sleeve valve device with check valve for controlling fluid flow, comprising:
　a housing, a flow passageway through said housing terminating in opposed ends, means by which said opposed ends can be connected in a pipe;
　a bore extending through said housing transversely respective to said flow passageway, a flow control sleeve rotatably received within said bore and sealingly engaging the peripheral surface of the bore; said passageway has confronting ends spaced apart by said bore;
　opposed ports in said sleeve diametrically opposed to one another that can selectively be rotated into registry with said flow passageway to thereby align said ports with the confronting ends of the passageway whereupon unrestricted flow can occur through the valve device;
　a movable wall section in said sleeve forms a closure member for one said opposed ports, said movable wall section is in the form of a check valve whereby when said ports are aligned with the confronting ends of said passageway, said check valve is moved to the opened position when flow occurs in one direction and is moved into the closed position when flow occurs in an opposite direction; and, an actuator for rotating said sleeve between alternate positions wherein one opposed port is aligned with alternate confronting ends of the passageway and thereby moved between the recited open and closed positions; said sleeve has a plurality of cut-outs at one end that forms a castellated upper marginal end; said actuator includes a member that has projections thereon extending into the cut-outs and thereby releasably engages the castellations; and means for rotating the actuator member and thereby rotate said sleeve from an open to a closed position, and vice versa;
　means forming an arcuate stop on said sleeve; and, means forming a curved stop member on said body, said arcuate stop and said curved stop member engage one another to selectively position the sleeve in one flow position when rotated in one direction and to position the sleeve in another flow position when rotated in the other direction;
　a shaft means for said actuator; a closure member located at a terminal end of said bore; seal means by which said shaft means extends through said closure member, one end of said shaft means engages said actuator, the opposed end of said shaft means can be engaged and rotated to thereby rotate said sleeve.

5. The valve device of claim 4 wherein said check valve has an outer circumferentially extending surface that is brought to bear against the surface of one said port with a wedge-like action whereby the check valve when in the cloesd position prevents fluid flow therethrough;
　an o-ring received on the outside surface of said check valve; said o-ring is of greater diameter than said flow passageway and thereby sealingly engages the wall surface of the bore adjacent the passagway;

said check valve is in the form of a concave disk and includes hinge means by which it is attached to said sleeve at a location that removes the valve free of the port;

said check valve can be removed from the interior of the sleeve when the closure member is removed from the housing.

6. A valve assembly having a flow passageway therethrough, said flow passageway has terminal ends for connection in series relationship respective to a flow line; said valve assembly includes a housing, an upwardly opening cylindrical bore in said housing, said flow passageway extends transversely through said cylindrical bore;

a sleeve rotatably and sealingly received within said bore, with the outer peripheral surface of the sleeve engaging the inner peripheral surface of the bore; diametrically opposed ports in said sleeve that are brought into axial alignment with said passageway when the sleeve is rotated into a flow permitting position;

said sleeve, when rotated to position the ports thereof transversely of said flow passageway, places the valve assembly in the closed position;

a closure member for said cylindrical bore;

a movable wall section in one of said opposed ports, said movable wall section forms a check valve in conjunction with said sleeve and the wall surface of the bore to prevent fluid flow through the valve in one direction while permitting flow to occur through the valve in the other direction;

an actuator for rotating said sleeve to bring either of the sleeve ports into alignment with either of the confronting passageway ends and thereby place the valve in either of several different flow positions including an open and closed position; said actuator includes a plurality of castellations formed adjacent the upper marginal end of said sleeve, and a plate member having a plurality of projections formed thereon for being received within the intervening space between said castellations; shaft means for rotating said plate member and thereby rotating said sleeve from one into another flow position; an arcuate stop means on said body, said arcuate stop means has opposed ends, and stop means on said sleeve for abuttingly engaging the opposed ends of said arcuate stop means when said sleeve is rotated to selectively position the sleeve ports respective to the passageway confronting ends.

* * * * *